(12) United States Patent
Konno et al.

(10) Patent No.: US 11,648,923 B2
(45) Date of Patent: May 16, 2023

(54) ON-BOARD BRAKE SYSTEM

(71) Applicant: TOYOTA JIDOSHA KABUSHIKI KAISHA, Toyota (JP)

(72) Inventors: Ikuru Konno, Toyoake (JP); Toru Nishitani, Nisshin (JP); Takenori Kubo, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/912,263

(22) Filed: Jun. 25, 2020

(65) Prior Publication Data

US 2020/0406877 A1    Dec. 31, 2020

(30) Foreign Application Priority Data

Jun. 28, 2019   (JP) .............................. JP2019-121196

(51) Int. Cl.

| | |
|---|---|
| *B60T 17/22* | (2006.01) |
| *B60T 13/58* | (2006.01) |
| *B60T 13/66* | (2006.01) |
| *B60T 13/14* | (2006.01) |
| *B60T 13/74* | (2006.01) |
| *B60T 7/12* | (2006.01) |

(52) U.S. Cl.
CPC ................ *B60T 13/58* (2013.01); *B60T 7/12* (2013.01); *B60T 13/148* (2013.01); *B60T 13/66* (2013.01); *B60T 13/745* (2013.01); *B60T 2270/402* (2013.01)

(58) Field of Classification Search
CPC . B60T 7/105; B60T 7/107; B60T 7/16; B60T 7/12; B60T 7/08; B60T 7/085; B60T 13/746; B60T 13/145; B60T 13/146; B60T 2270/413; B60T 2270/414; B60T 13/58; B60T 13/66; B60T 13/148; B60T 13/745; B60T 2270/402

See application file for complete search history.

(56) References Cited

U.S. PATENT DOCUMENTS

| | | | | |
|---|---|---|---|---|
| 4,938,542 | A | * | 7/1990 | Kline .................... H02J 7/1423 303/20 |
| 5,567,021 | A | * | 10/1996 | Gaillard .................. B60T 7/042 303/3 |
| 9,494,940 | B1 | * | 11/2016 | Kentley ................ B60W 10/04 |
| 2012/0090315 | A1 | * | 4/2012 | Anderson ............... B60T 7/042 60/545 |

(Continued)

FOREIGN PATENT DOCUMENTS

| | | |
|---|---|---|
| CN | 104249724 A | 12/2014 |
| CN | 107697047 A | 2/2018 |

(Continued)

*Primary Examiner* — Nicholas J Lane
*Assistant Examiner* — Stephen M Bowes
(74) *Attorney, Agent, or Firm* — Sughrue Mion, PLLC

(57) ABSTRACT

An on-board brake system mounted in an autonomous vehicle comprises a brake unit, a first brake actuator and a second brake actuator for driving the brake unit, and a main ECU for controlling drive of the first and second brake actuators; the second brake actuator is an accumulating actuator; and when an emergency stop switch is depressed, the main ECU operates only the second brake actuator or operates the second brake actuator with precedence over the first brake actuator.

4 Claims, 4 Drawing Sheets

(56) References Cited

U.S. PATENT DOCUMENTS

| | | | |
|---|---|---|---|
| 2013/0221737 A1* | 8/2013 | Richard | ............... B60T 8/1755 |
| | | | 303/119.1 |
| 2015/0001919 A1 | 1/2015 | Murayama et al. | |
| 2017/0001614 A1* | 1/2017 | Yogo | ..................... B60T 8/4872 |
| 2017/0120887 A1 | 5/2017 | Kurahashi et al. | |
| 2018/0043873 A1 | 2/2018 | Tanimoto | |
| 2020/0023820 A1* | 1/2020 | Van Thiel | ............... B60T 7/042 |
| 2020/0039490 A1 | 2/2020 | Kobayashi et al. | |
| 2021/0387602 A1* | 12/2021 | Witte | ..................... B60T 13/16 |

FOREIGN PATENT DOCUMENTS

| | | |
|---|---|---|
| JP | 2012-530644 A | 12/2012 |
| JP | 2017-084140 A | 5/2017 |
| JP | 2018-12478 A | 1/2018 |
| JP | 2018-24313 A | 2/2018 |
| JP | 2018-047807 A | 3/2018 |

\* cited by examiner

ON-BOARD BRAKE SYSTEM

CROSS REFERENCE TO RELATED APPLICATION

This application claims priority to Japanese Patent Application No. 2019-121196 filed on Jun. 28, 2019, which is incorporated herein by reference in its entirety including the specification, claims, drawings, and abstract.

TECHNICAL FIELD

The present specification discloses an on-board brake system, which is mounted in an autonomous vehicle, capable of stopping the vehicle in an emergency when an emergency stop switch is depressed.

BACKGROUND

In recent years, autonomous vehicles are known for automatically executing dynamic driving tasks for the vehicle at the vehicle side in place of a driver. In such an autonomous vehicle, an emergency stop switch is normally provided inside or outside the vehicle for stopping the vehicle in an emergency. For example, in patent document 1, when the emergency stop switch is depressed, the vehicle is stopped by an electric-powered parking brake mounted in the vehicle and control is performed for maintaining the stopped state.

CITATION LIST

Patent Literature

Patent Document 1: JP 2017-084140 A

Then, in the event it becomes necessary to stop a vehicle in an emergency, the vehicle should be stopped quickly and reliably. In Patent Document 1, the vehicle is stopped by an electric parking brake, however, a specific configuration of the electric parking brake is not discussed. Thus, in the art of Patent Document 1, it is unclear whether the vehicle can be stopped quickly and reliably.

Therefore, the present specification discloses an on-board brake system capable of quickly and reliably stopping the vehicle when an emergency stop switch has been depressed.

SUMMARY

The on-board brake system disclosed in the present specification includes a brake unit mounted in an autonomous vehicle and contacting a rotating member rotating together with a wheel to apply a brake to the wheel, a first brake actuator and a second brake actuator for supplying hydraulic pressure to the brake unit to drive the brake unit, and a controller for controlling drive of the first and second brake actuators, wherein the second brake actuator is an accumulating actuator for supplying hydraulic pressure to the brake unit by releasing a hydraulic liquid stored in advance in a pressurized stat in a pressure storage container, and the controller operates, when an emergency stop switch is depressed, only the second brake actuator, or the second brake actuator with precedence over the first brake actuator.

The accumulating second brake actuator has high responsiveness. Therefore, when an emergency stop is necessary, only the second brake actuator is operated or the second brake actuator is operated with precedence so that a braking force can be generated more quickly. As a result, when the emergency stop switch is depressed, the vehicle can be stopped quickly and reliably. It should be noted "precedence" is intended to mean at least either the operation start time is performed in advance or the order of electric power supply precedence is set higher.

Furthermore, the first brake actuator is a non-accumulating actuator for driving an electric motor to supply the hydraulic liquid to the brake unit, and the controller need not operate the first brake actuator when the emergency stop switch is depressed.

In the case of the first brake actuator, which is non-accumulating, during braking, an electric power supply for driving the electric motor is necessary and power consumption is large. During an emergency, by not operating the first brake actuator in this manner, electric power consumption can be limited, thereby preventing electric power insufficiency during the emergency.

Furthermore, in addition, an auxiliary battery for supplying electric power to the brake system and a sub battery for supplying electric power to at least the second brake actuator when the auxiliary battery loses electric power may be provided.

Providing the sub battery can more reliably prevent a complete loss of electric power and can ensure braking force by the electric-powered second brake actuator.

In this case, the sub battery may be limited in supplying electric power to the second brake actuator when the auxiliary battery is available.

Limiting the electric power supply from the sub battery except when the auxiliary battery loses electric power can prevent excessive consumption of sub battery power.

Furthermore, the auxiliary battery and the sub battery are electrically connected in parallel to the second brake actuator via diodes, and when the auxiliary battery has a voltage higher than or equal to the sub battery, electric power may be supplied from the auxiliary battery to the second brake actuator.

By electrically connecting the auxiliary battery and the sub battery to the second brake actuator via diodes, switching the path of electric power according to the relative magnitude of both battery voltages can be achieved with a simple circuit.

According to the on-board brake system disclosed in the present specification, the vehicle can be quickly and reliably stopped when the emergency stop switch is depressed.

BRIEF DESCRIPTION OF DRAWINGS

Embodiment(s) of the present disclosure will be described based on the following drawings, wherein.

DESCRIPTION OF EMBODIMENTS

An embodiment of an on-board brake system 22 is described hereinafter with reference to the attached drawings. In the attached drawings to be referenced below, "Fr", "Up", and "L" respectively refer to the Front side in a longitudinal direction, the Up side in a vertical direction, and the Left side in a transverse direction of the vehicle.

Figure 1:
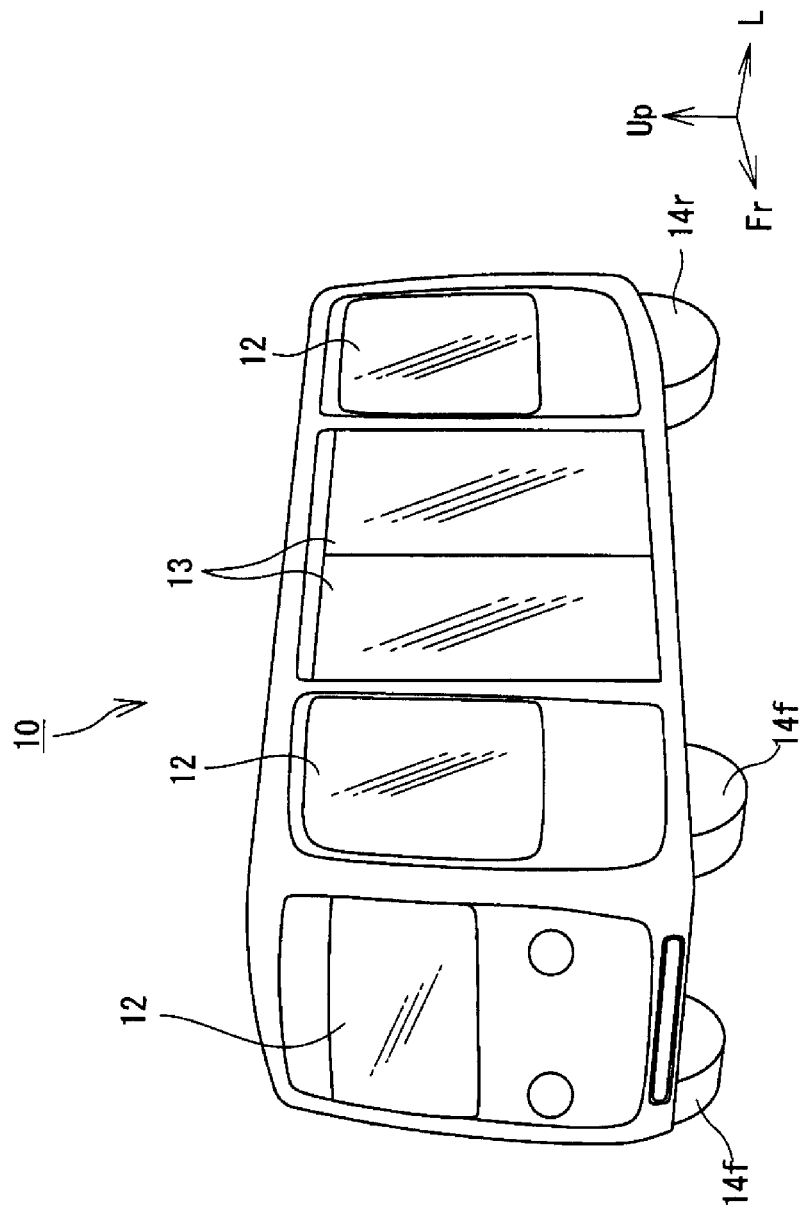
FIG. 1 is a perspective view from diagonally in front of a vehicle mounted with an on-board brake system.
Figure 2:
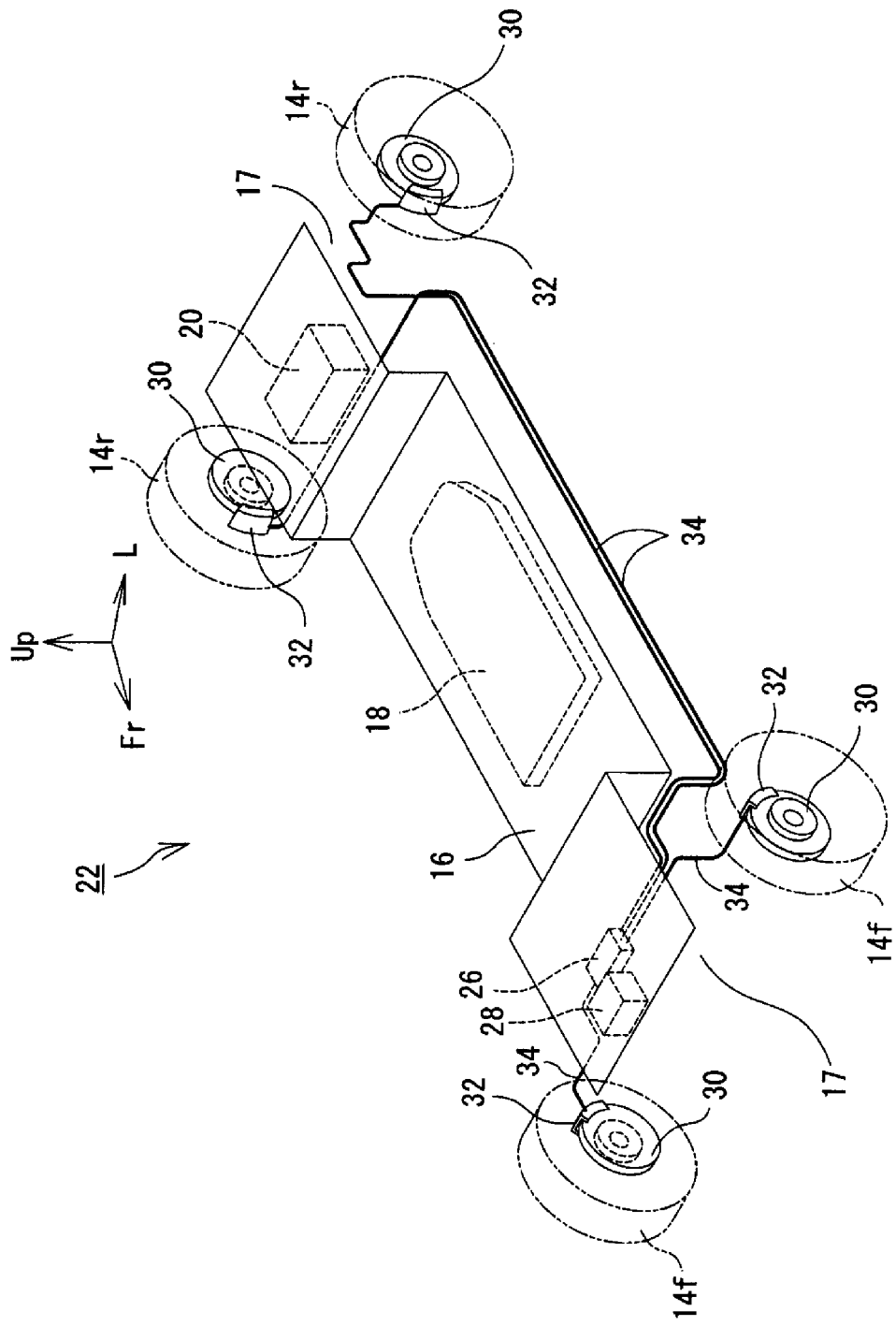
FIG. 2 is a perspective view schematically showing the on-board brake system.

FIG. 1 is as perspective view from diagonally in front of a vehicle 10 mounted with an on-board brake system 22 (refer to FIG. 2). The vehicle 10 is utilized as a bus for transporting passengers while traveling along a predetermined route within a specific area. However, the utilization of the vehicle 10 disclosed in the present specification can be changed accordingly and, for example, the vehicle 10 may be utilized as a mobile business space. For example, the vehicle 10 may be utilized as a small retail store displaying and selling a variety of products or a shop preparing and selling food and drink. Furthermore, in another utilization, the vehicle 10 may be utilized as an office or the like for performing business tasks or having meetings or the like. In addition, the vehicle 10 may be utilized as a taxi or bus for carrying passengers or baggage or as a transport vehicle. Moreover, the utilization field of the vehicle 10 is not limited to business and, for example, the vehicle 10 may be utilized as a means for personal transportation. In addition, the travel pattern and travel speed of the vehicle 10 can be changed as necessary.

The vehicle 10 of the present embodiment is mounted with an automated driving function, in which the vehicle 10 performs all dynamic driving tasks. Here, "automated driving" refers to, for example, any of the automation levels 3 to 5 as defined by SAE International of the USA. Level 3 is a driving format in specific locations, such as an expressway, where despite all dynamic driving tasks are automated, driver operation is required in an emergency. Furthermore, level 4 is a driving format limited to specific locations where all dynamic driving tasks are automated and are automatically processed also in an emergency. Level 5 is a driving format where automated driving is possible under nearly all conditions without restriction, such as location, and means "fully automated driving". In the description hereinafter, an "operator" means something that provides various instructions to the vehicle 10, and the operator may be riding in the vehicle 10 or may be outside and not riding (for example, a control center outside the vehicle).

As one function to achieve automated driving, the vehicle 10 is provided with an emergency stop function. The emergency stop function automatically stops the vehicle 10 when an emergency stop switch is depressed. The emergency stop switch may be provided inside the vehicle 10 or may be provided outside the vehicle 10, for example, in a control center or the like provided outside the vehicle. Furthermore, the emergency stop switch is not limited to one and a plurality may be provided. Therefore, a total of two emergency stop switches may be provided, one inside and one outside the vehicle 10. If the emergency stop switch is depressed, the on-board brake system 22 performs an emergency stop of the vehicle 10 and this will be described hereinafter. Naturally, steering of the vehicle 10, lighting of hazard lamps, and so forth may be linked with the emergency stop of the vehicle 10 and also performed automatically to safely stop the vehicle 10.

The vehicle 10 is an electric vehicle having for a motor a drive motor 20 (refer to FIG. 2) and on the floor of the vehicle 10 is mounted a main battery 18 for supplying electric power to the drive motor. Furthermore, as shown in FIG. 1, the vehicle 10 does not have a bonnet or trunk and has an external appearance of a substantially rectangular shape with the front and rear surfaces rising almost vertically. The front, rear, and sides of the vehicle 10 are provided with windows 12. Furthermore, double sliding type of doors 13 are provided in the center surface of the left side of the vehicle 10 and slide to open and close along the longitudinal direction of the vehicle.

In the vicinity of the front end of the vehicle 10 are disposed a pair of front wheels 14f, and in the vicinity of the rear end of the vehicle 10 are disposed a pair of rear wheels 14r. Hereinafter, the front wheels 14f and rear wheels 14r are simply called "wheels 14" and the f and r suffixes are omitted when they need not be distinguished.

Figure 3:
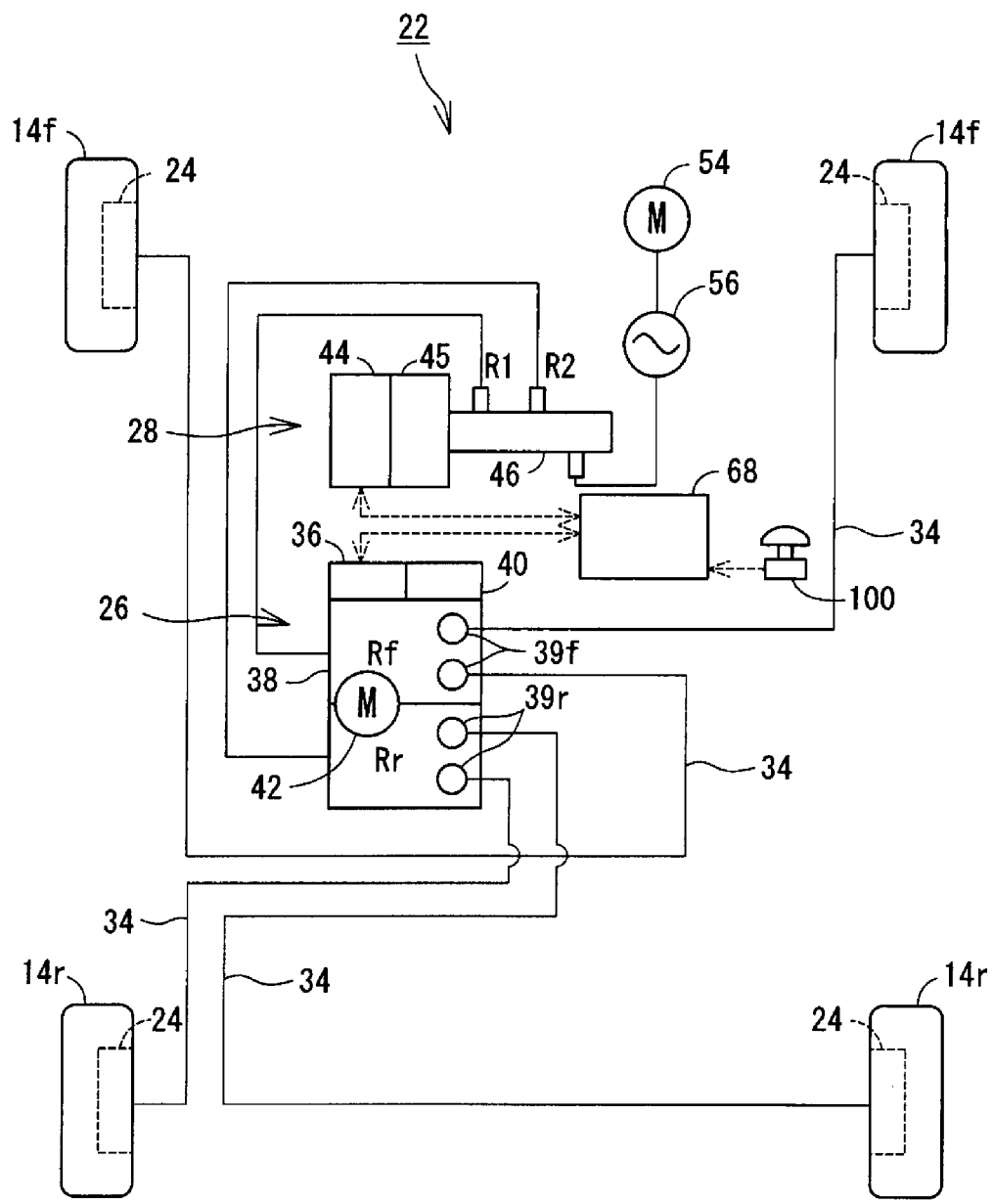
FIG. 3 is a block diagram of the on-board brake system.
Figure 4:
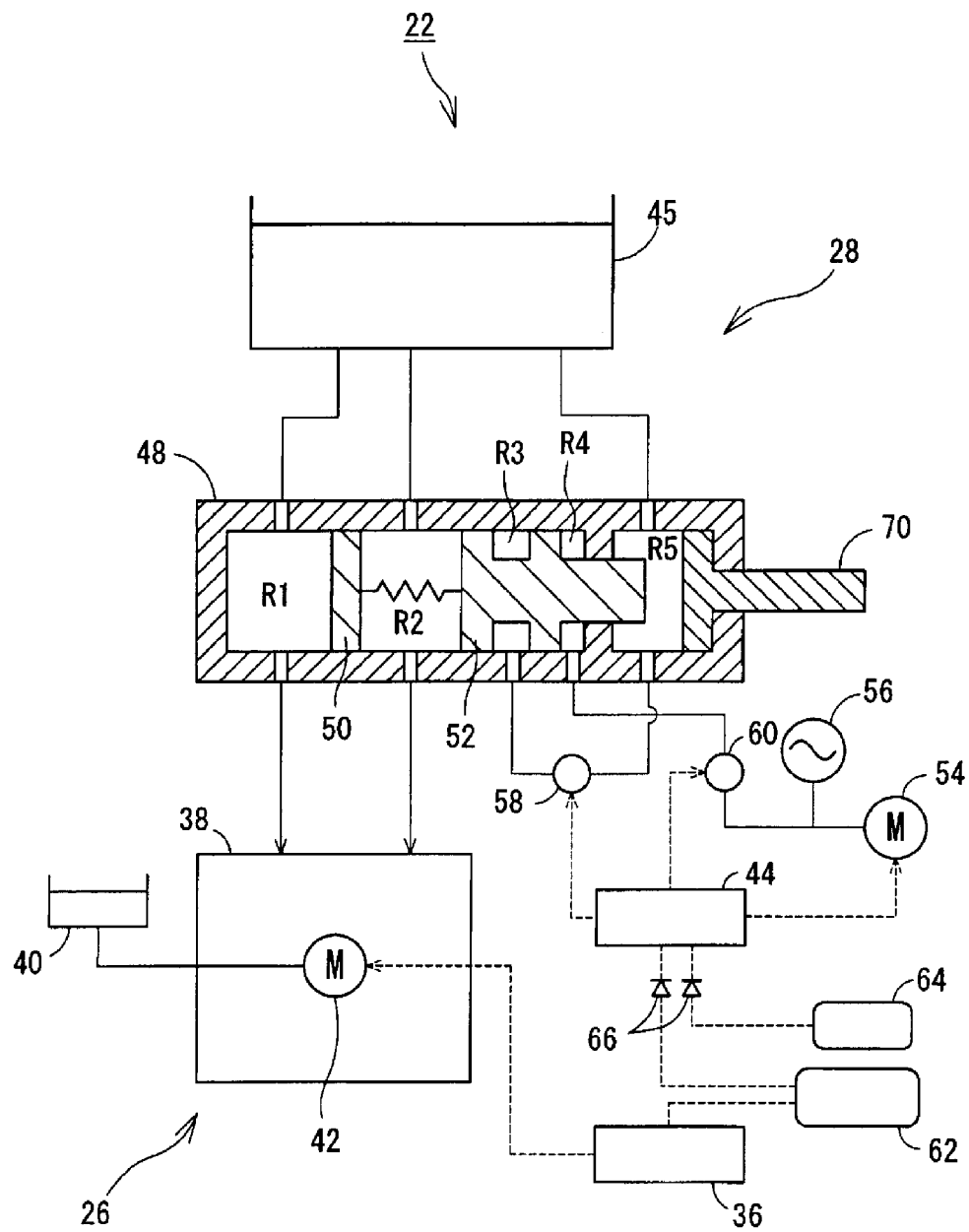
FIG. 4 schematically shows first and second brake actuators.

Next, a configuration of the on-board brake system 22 mounted in the vehicle 10 is explained with reference to FIG. 2 to FIG. 4. FIG. 2 schematically shows a perspective view of the on-board brake system 22. Furthermore, FIG. 3 is a block diagram of the on-board brake system 22. Moreover, FIG. 4 schematically shows the first and second brake actuators 26, 28.

The on-board brake system 22 is used to apply brakes to the wheels 14 and comprises a brake unit 24 for applying brakes to the wheels by contact with rotating members rotating together with the wheels, the first brake actuator 26 and the second brake actuator 28 for supplying hydraulic pressure to and driving the brake unit 24, and an auxiliary battery 62 and a sub battery 64 for supplying electric power to the first and second brake actuators 26, 28.

As shown in FIG. 2, a floor panel 16 forming a floor surface of the vehicle compartment is elevated at the forward and rear thereof. Underneath these elevated portions, namely, the front and rear of the vehicle 10, are storage compartments 17 housing drive system and electrical system devices, such as the drive motor 20, the brake actuators, a steering actuator, an air-conditioning unit, and so forth. In the present embodiment, the first and second brake actuators 26, 28 to be described hereinafter are disposed in the front storage compartment 17 and the drive motor 20 is disposed in the rear storage compartment 17. Furthermore, underneath the floor panel 16 between the front and rear storage compartments 17 is disposed the main battery 18.

The brake unit 24 applies brakes (for decelerating or stopping) to the wheels 14 by hydraulic pressure generated at the first brake actuator 26 or the second brake actuator 28. This brake unit 24, namely, disc brakes, has a brake disc 30 and a brake caliper 32 attached to each wheel 14. The brake disc 30 is a rotating member rotating together with the wheel 14. The brake caliper 32 has a pair of brake pads (not shown) capable of sandwiching the brake disc 30. This brake caliper 32 is driven by hydraulic pressure supplied via a brake tube 34 to generate a braking force. The brake tubes 34 connect to the first brake actuator 26 as shown in FIG. 2.

The brake unit 24 may have another configuration provided braking force is provided by hydraulic pressure. For example, the brake unit 24 may be a drum brake having a drum disposed inside the wheel 14 and a brake shoe disposed inside the drum. Furthermore, a brake mechanism mounted in each of the four wheels 14 may be identical with or different from each other. Therefore, for example, the brake unit 24 may have drum brakes mounted to the front wheels 14f and disc brakes mounted to the rear wheels 14r.

Next, the first brake actuator 26 and the second brake actuator 28 for supplying drive hydraulic pressure to this brake unit 24 will be described. The first brake actuator 26 and the second brake actuator 28 both supply hydraulic pressure to the brake unit 24 and are driven and controlled by a main ECU 68. A signal from an emergency stop switch 100 disposed inside or outside the vehicle 10 is input by this main ECU 68.

In FIG. 3 and FIG. 4, the first brake actuator 26 comprises an actuator body 38, a first reservoir tank 40, a first motor 42, and a first brake ECU 36. The first brake ECU 36 is connected to the main ECU 68 via a communication line and composed so that the first motor 42 is operated on the basis of a braking force request from the main ECU 68 to pump and pressurize from the first reservoir tank 40.

The actuator body 38 is divided into a front liquid chamber Rf and a rear liquid chamber Rr as shown in FIG. 3. Two front ports 39f are formed in the front liquid chamber Rf. The two front ports 39f are linked to the brake unit 24 of the front wheels 14f via the brake tubes 34. Similarly, two rear ports 39r are formed in the rear liquid chamber Rr and the rear ports 39r are linked to the brake unit 24 of the rear wheels 14r via the brake tubes 34.

In this manner, by dividing the actuator body 38 into the two chambers of the front liquid chamber Rf and the rear liquid chamber Rr, even if one of the liquid chambers is damaged or the like, hydraulic pressure can be supplied to the wheels 14 from the other liquid chamber. Of course, however, this number of liquid chamber partitions is one example and may be modified accordingly. Therefore, for example, the actuator body 38 may be composed without being partitioned to have a single liquid chamber or may be partitioned into multiple (for example, four) liquid chambers.

Hydraulic liquid is stored in the reservoir tank 40. The first motor 42 pumps the hydraulic liquid from the first reservoir tank 40 to the front liquid chamber Rf and the rear liquid chamber Rf based on instructions from the first brake ECU 36. Thus, drive hydraulic pressure is supplied to the brake unit 24. In other words, the first brake actuator 26 does not pressurize and accumulate hydraulic liquid in advance and is a non-accumulating actuator for driving the first motor 42 during braking to generate hydraulic pressure.

The second brake actuator 28 comprises a master cylinder 46, a second reservoir tank 45, a second motor 54, an accumulator 56, and a second brake ECU 44. The master cylinder 46 has, as shown in FIG. 4, a cylinder housing 48, and first and second pistons 50, 52 capable of back and forth movement within the cylinder housing 48. The first piston 50 and the second piston 52 are linked via a spring and mutually interlocked and move back and forth. Then, axially on both sides of the first piston 50 are formed a first liquid chamber R1 and a second liquid chamber R2. In the periphery of the second piston 52 are formed a plurality of steps, and these steps cause a third liquid chamber R3 and a fourth liquid chamber R4 to form axially in line in the periphery of the second piston 52. Furthermore, in an axial position adjacent with the fourth liquid chamber R4 is formed a fifth liquid chamber R5.

The first liquid chamber R1, the second liquid chamber R2, and the fifth liquid chamber R5 are all connected to the second reservoir tank 45, and through the back and forth movement of the pistons 50, 52 hydraulic liquid is supplied from the second reservoir tank 45 to the liquid chambers R1, R2, R5. Furthermore, the first liquid chamber R1 is connected to the front liquid chamber Rf of the first brake actuator 26 and the second liquid chamber R2 is connected to the rear liquid chamber Rr of the first brake actuator 26. Then, by sending hydraulic liquid from the first liquid chamber R1 and the second liquid chamber R2 to the brake unit 24 via the front liquid chamber Rf and the rear liquid chamber R4 the brake unit 24 operates.

The third liquid chamber R3 and the fifth liquid chamber R5 are connected via a first electromagnetic valve 58. When the first electromagnetic valve 58 is in an open state, the hydraulic pressure of the third liquid chamber R3 cancels the hydraulic pressure of the opposing fifth liquid chamber R5 so that the second piston 52 operates only by the hydraulic pressure of the fourth liquid chamber R4.

The fourth liquid chamber R4 is connected to the accumulator 56 via a second electromagnetic valve 60. The accumulator 56 is a pressure storage container for storing in advance hydraulic liquid in a pressurized state pumped from the second reservoir tank 45 by the second motor 54. When the second electromagnetic valve 60 is switched from a closed state to an open state, high pressure hydraulic liquid is released from the accumulator 56 to the fourth liquid chamber R4 causing the first and second pistons 50, 52 to move in a direction pressurizing the first liquid chamber R1 and the second liquid chamber R2. This then supplies drive hydraulic liquid to the brake unit 24.

Furthermore, the master cylinder 46 may be provided with an input piston 70 capable of back and forth movement inside the fifth liquid chamber R5. This input piston 70 may be mechanically linked, for example, with a brake pedal (not shown). Moreover, in this case, the brake pedal may be operated by an occupant or operated by air pressure or the like. The second electromagnetic valve 60 should be in a closed state when moving the input piston 70 back and forth. The second brake ECU 44 controls the drive of the first electromagnetic valve 58, the second electromagnetic valve 60, and the second motor 54 in accordance with instructions from the main ECU 68.

As an electric power source for driving the first brake actuator 26 and the second brake actuator 28 as described above, the auxiliary battery 62 is mounted in the vehicle 10. This auxiliary battery 62 is connected electrically to the first brake actuator 26 and the second brake actuator 28. Furthermore, the sub battery 64 is also mounted in the vehicle 10 as a backup electric power source in the event the auxiliary battery 62 loses electric power. The sub battery 64 is a low voltage battery compared to the auxiliary battery 62. This sub battery 64 is electrically connected to the second brake actuator 28 and not electrically connected to the first brake actuator 26.

Explained more specifically, the auxiliary battery 62 and the sub battery 64 are both electrically connected to the second brake actuator 28 via diodes 66. Although the batteries 62, 64 are connected only to the brake ECUs 36, 44 in FIG. 4, in actuality the auxiliary battery 62 is also electrically connected to electronic devices, such as the motors 42, 54, the electromagnetic valves 58, 60, and so forth, incorporated into the first and second brake actuators 26, 28 in addition to the brake ECUs 36, 44. Similarly, the sub battery 64 is also electrically connected to electronic devices, such as the motor 54, the electromagnetic valves 58, 60, and so forth, incorporated into the second brake actuator 28 in addition to the second brake ECU 44. In this manner, a circuit connecting in parallel the main electric power source (auxiliary battery 62) and the spare electric power source (sub battery 64) via diodes 66 is called a diode-OR circuit or a backup electric power source circuit. In such a diode-OR circuit (backup electric power source circuit), when the voltage of the main electric power source is higher than the voltage of the spare electric power source, electric power is supplied from the main electric power source, and when the voltage of the main electric power source is lower than the voltage of the spare electric power source, electric power is supplied from the spare electric power source. Therefore, in the present embodiment, in a state where the voltage of the auxiliary battery 62 is higher than the voltage of the sub battery 64, electric power is supplied from the auxiliary battery 62 and electric power is not output from the sub battery 64. In this manner, having a configuration where the sub battery 64 is not normally used effectively prevents a problem where electric power of the sub battery 64 is insufficient during an emergency. Furthermore, employing the diode-OR circuit obviates the need for a complex switch mechanism or the like and enables the switching of operating electric power sources with a simple circuit configuration.

The main ECU 68 functions as a controller for the on-board brake system 22 as mentioned above. This main ECU 68 is, for example, a microcontroller having a CPU and memory, and issues instructions to the first and second brake ECUs 36, 44 to drive the first and second brake actuators 26, 28 based on operation instructions by an operator, detected results by various sensors, or the like.

Here, as described hereinabove, in the vehicle 10 in the present embodiment, an emergency stop of the vehicle 10 is performed when the emergency stop switch has been depressed. In order to implement this emergency stop, when the main ECU 68 receives a signal from the emergency stop switch, only the second brake actuator 28 operates, or the second brake actuator 28 operates with precedence over the first brake actuator 26. Having such a configuration is due to the following reasons.

When the emergency stop switch is depressed, it is desirable to stop the vehicle 10 as quickly and as reliably as possible. Since braking force is provided by the second brake actuator 28 releasing hydraulic pressure stored in the accumulator 56, responsiveness is high compared to the first brake actuator 26.

Furthermore, since the second brake actuator 28 stores hydraulic pressure in advance, only electric power sufficient to drive the electromagnetic valve is required when braking is performed and is extremely small. On the other hand, the first brake actuator 26 is required to drive the first motor 42 when braking is performed and the required electric power is large. In other words, the second brake actuator 28 requires less electric power during braking compared to the first brake actuator 26 so it can be said the source electric power, even in a low state, is suitable for stopping the vehicle 10 since the operation is reliable. Therefore, in the present embodiment, during an emergency stop when the vehicle must be stopped quickly and reliably, only the second brake actuator 28 is operated or the second brake actuator 28 is operated with precedence over the first brake actuator 26.

In a configuration where the second brake actuator 28 is operated during an emergency stop and the first brake actuator 26 is not operated, electric power consumption can be kept low during the emergency stop. Then, this further improves safety of the vehicle 10 by enabling the surplus electric power to be used for other operations to maintain safety, for example, steering or turning on indicator lights.

Furthermore, if the first brake actuator 26 is operated together with the second brake actuator 28 during an emergency stop, a stronger braking force is obtained so that the vehicle 10 can be stopped more reliably. As described hereinabove, if both the first and second brake actuators 26, 28 are operated during an emergency stop, the second brake actuator 28 is operated with precedence over the first brake actuator 26. Here, "precedence" is intended to mean at least either the operation start time is performed in advance or the order of electric power supply precedence is set higher. Therefore, operation of the second brake actuator 28 may be started earlier than the first brake actuator 26. Furthermore, during an emergency stop, the main ECU 68 may supply sufficient electric power to the second brake actuator 28 and supply only surplus electric power to the first brake actuator 26 when the second brake actuator 28 is operated. If the surplus electric power is insufficient for the operation of the first brake actuator 26, the main ECU 68 need not operate the first brake actuator 26.

The description hereinabove is merely one embodiment and for brake actuators may comprise the first brake actuator 26 and the second brake actuator 28, which is an accumulating actuator, and may be modified to another configuration provided that when the emergency stop switch is depressed, only the second brake actuator 28 is operated or the second brake actuator 28 is operated with precedence over the first brake actuator 26. For example, although the first brake actuator 26 is a non-accumulating actuator in the present embodiment, the first brake actuator 26 may be an accumulating type. Furthermore, the electric power source for the on-board brake system 22 may be only the auxiliary battery 62 and the sub battery 64 may be omitted. Moreover, the configuration of the vehicle mounted with the on-board brake system 22 may be modified accordingly, for example, and instead of an electric vehicle may be a hybrid vehicle or fuel cell vehicle.

REFERENCE SIGNS LIST

10 VEHICLE
12 WINDOW
13 DOOR
14 WHEEL
16 FLOOR PANEL
17 STORAGE COMPARTMENT
18 MAIN BATTERY
20 DRIVE MOTOR
22 ON-BOARD BRAKE SYSTEM
24 BRAKE UNIT
26 FIRST BRAKE ACTUATOR
28 SECOND BRAKE ACTUATOR
30 BRAKE DISC
32 BRAKE CALIPER
34 BRAKE TUBE
36 FIRST BRAKE ECU
38 ACTUATOR BODY
40 FIRST RESERVOIR TANK
42 FIRST MOTOR
44 SECOND BRAKE ECU
45 SECOND RESERVOIR TANK
46 MASTER CYLINDER
48 CYLINDER HOUSING
50 FIRST PISTON
52 SECOND PISTON
54 SECOND MOTOR
56 ACCUMULATOR
58 FIRST ELECTROMAGNETIC VALVE
60 SECOND ELECTROMAGNETIC VALVE
62 AUXILIARY BATTERY
64 SUB BATTERY
66 DIODE
68 MAIN ECU
70 INPUT PISTON
100 EMERGENCY STOP SWITCH

The invention claimed is:

1. An on-board brake system mounted in an autonomous vehicle comprising:
   a brake unit contacting a rotating member rotating together with a wheel to apply a brake to said wheel;
   a first brake actuator and a second brake actuator, both the first brake actuator and the second brake actuator supplying hydraulic pressure to said brake unit to drive said brake unit;

a controller for controlling drive of said first and second brake actuators;

an auxiliary battery for supplying electric power to said on-board brake system; and a sub battery for supplying electric power to at least said second brake actuator when said auxiliary battery loses power;

wherein said second brake actuator is an accumulating actuator for supplying hydraulic pressure to said brake unit by releasing hydraulic liquid stored in advance in a pressurized state in a pressure storage container;

said controller operates, when an emergency stop switch is depressed, only said second brake actuator, or said second brake actuator with precedence over said first brake actuator;

said first brake actuator receives electric power supplied from said auxiliary battery and is not electrically connected with said sub battery; and said sub battery is controlled to limit supplying electric power to said second brake actuator when said auxiliary battery is available to supply electric power.

2. The on-board brake system according to claim 1, wherein:

said first brake actuator is a non-accumulating actuator for driving an electric motor to supply said hydraulic liquid to said brake unit; and said controller does not operate said first brake actuator when said emergency stop switch is depressed.

3. An on-board brake system mounted in an autonomous vehicle comprising:

a brake unit contacting a rotating member rotating together with a wheel to apply a brake to said wheel;

a first brake actuator and a second brake actuator, both the first brake actuator and the second brake actuator supplying hydraulic pressure to said brake unit to drive said brake unit;

a controller for controlling drive of said first and second brake actuators;

an auxiliary battery for supplying electric power to said on-board brake system; and a sub battery for supplying electric power to at least said second brake actuator when said auxiliary battery loses power;

wherein said second brake actuator is an accumulating actuator for supplying hydraulic pressure to said brake unit by releasing hydraulic liquid stored in advance in a pressurized state in a pressure storage container;

said controller operates, when an emergency stop switch is depressed, only said second brake actuator, or said second brake actuator with precedence over said first brake actuator;

said first brake actuator receives electric power supplied from said auxiliary battery and is not electrically connected with said sub battery;

said auxiliary battery and said sub battery are electrically connected in parallel to said second brake actuator via diodes; and when said auxiliary battery has a voltage higher than or equal to said sub battery, electric power is supplied from said auxiliary battery to said second brake actuator.

4. The on-board brake system according to claim 3, wherein:

said first brake actuator is a non-accumulating actuator for driving an electric motor to supply said hydraulic liquid to said brake unit; and said controller does not operate said first brake actuator when said emergency stop switch is depressed.

\* \* \* \* \*